United States Patent
Meneses Herrera et al.

(10) Patent No.: US 9,979,308 B1
(45) Date of Patent: May 22, 2018

(54) SYNCHRONOUS RECTIFIER SWITCH CONTROL DURING BURST MODE OPERATION OF AN LLC CONVERTER

(71) Applicant: Infineon Technologies Austria AG, Villach (AT)

(72) Inventors: David Meneses Herrera, Villach (AT); Matteo-Alessandro Kutschak, Ludmannsdorf (AT)

(73) Assignee: Infineon Technologies Austria AG, Villach (AT)

( * ) Notice: Subject to any disclaimer, the term of this patent is extended or adjusted under 35 U.S.C. 154(b) by 0 days. days.

(21) Appl. No.: 15/612,615

(22) Filed: Jun. 2, 2017

(51) Int. Cl.
*H02M 3/335* (2006.01)
*H02M 3/337* (2006.01)
*H02M 1/00* (2006.01)

(52) U.S. Cl.
CPC ..... *H02M 3/33592* (2013.01); *H02M 3/3376* (2013.01); *H02M 2001/0035* (2013.01); *Y02B 70/1458* (2013.01)

(58) Field of Classification Search
None
See application file for complete search history.

(56) References Cited

PUBLICATIONS

"Enhanced high voltage resonant controller", STMicroelectronics, L6699, Datasheet—production data, Doc ID 022835 Rev 2, Jan. 2013, Available online at http://www.st.com/content/ccc/resource/technical/document/datasheet/e6/f2/bc/f4/85/5d/44/cd/DM00048921.pdf/files/DM00048921.pdf/jcr:content/translations/en.DM00048921.pdf.
Abdel-Rahman, Sam, "Resonant LLC Converter: Operation and Design—250W 33Vin 400Vout Design Example", Infineon Technologies North America (IFMA) Corp., Application Note AN 2012-09, V1.0 Sep. 2012.
Di Domenico, Francesco et al., "3 kW dual-phase LLC evaluation board Using 600 V CoolMOS™ C7 and digital control by XMC4400", Infineon Technologies AG, Oct. 2016, V1.0, Oct. 12, 2016, Available online at http://www.infineon.com/dgdl/infineon-ApplicationNote_Evaluationboard_3kW_dual_phase_LLC-AN-v01_00-En.pdf?fileId=5546d462580663ef01582eb629670118.
Di Domenico, Francesco et al., "600 W Halbridge LLC evaluation board with 600 V CoolMOS™ C7 and digital control by XMC™", Infineon Technologies AG, May 2016, Revision1.0, Mar. 29, 2016, Revision1.1, Jul. 14, 2016, Available online at http://www.infineon.com/dgdl/Infineon-ApplicationNote-600W-HB-LLC-Evalboard-with-C7600V-and-digital-control-by-XMC-AN-v01_00-EN.pdf?fileId=5546d46253f6505701544cc1d15c20d7.

(Continued)

*Primary Examiner* — Henry Lee, III
(74) *Attorney, Agent, or Firm* — Murphy, Bilak & Homiller, PLLC

(57) ABSTRACT

An LLC converter has a primary side with power switch devices coupled to an LLC tank circuit at a common node, a secondary side with synchronous rectifier switch devices, and a transformer coupling the primary side to the secondary side. In a first mode of operation, the power switch devices and the synchronous rectifier switch devices are switched at a frequency calculated to regulate an output voltage of the LLC converter. In a second mode of operation during light-load conditions in which the output voltage is unregulated, the power switch devices are switched until the output voltage rises to a first level and then turned off until the output voltage falls to a second level below the first level. The synchronous rectifier switch devices are continuously switched in the second mode of operation, irrespective of the state of the output voltage.

20 Claims, 6 Drawing Sheets

(56) References Cited

PUBLICATIONS

Liu, Jianwei et al., "Design Guide for LLC Converter vvith ICE2HS01G", Infineon Technologies Asia Pacific, Power Management & Supply, Edition Jul. 6, 2011, Application Note, V1.0, Jul. 2011, Available online at http://www.infineon.com/dgdl/Design+Guide+for+LLC+Converter+with+ICE2HS01G+05072011.pdf?fileId=db3a304330f68606013103ebd94f3e98.

Steiner, Alois et al., "600 W Half Bridge LLC Evaluation Board with 600 V CoolMOS™ C7", Infineon Technologies AG, Jun. 2015, Revision1.2, Jun. 24, 2015, Available online at http://www.infineon.com/dgdl/Infineon-ApplicationNote_600WHalfbridgeLLC_Evaluation_Board_with_600V_CoolMOS_C7-AN-v01_00-EN.pdf?fileId=5546d4624e24005f014e2ef4761132a3.

Yang, Bo et al., "Over Current Protection Methods for LLC Resonant Converter", Eighteenth Annual IEEE Applied Power Electronics Conference and Exposition, APEC '03, Miami Beach, FL, Feb. 2003, pp. 605-609.

SYNCHRONOUS RECTIFIER SWITCH CONTROL DURING BURST MODE OPERATION OF AN LLC CONVERTER

TECHNICAL FIELD

The present application relates to LLC converters, in particular synchronous rectifier (SR) control during burst mode operation of an LLC converter.

BACKGROUND

LLC converters have a topology that utilizes a combination of two inductors and one capacitor ("LLC") on the primary side of the converter. A switching (full or half) bridge on the primary side generates a square waveform that excites the LLC tank circuit, which in response outputs a resonant sinusoidal current that is scaled and rectified by a transformer and rectifier circuit of the LLC converter. An output capacitor filters the rectified ac current and outputs a DC voltage.

Synchronous rectifier (SR) switches on the secondary side of an LLC converter are conventionally off during light-load conditions in which the output voltage is unregulated, and thus function as diode rectifiers. The PWM (pulse width modulation) pattern generation is simpler with this approach, avoids reverse power flow and reduces the likelihood of hard-commutation, but reduces the achievable efficiency due to higher losses in the built-in FET (field-effect-transistor) diodes.

A common driving scheme for the bridge switch devices on the primary side of an LLC converter uses a bootstrap capacitor. However, the bootstrap capacitor must be first charged in order to apply the proper PWM pattern. This is applicable for the converter start-up, but also in case of burst mode operation during light-load conditions since the off time can be long enough to discharge the bootstrap capacitor.

Typically, a large pulse of several switching cycles is applied to the low-side bridge switch device to charge the bootstrap capacitor to a sufficient level that allows proper PWM operation of the high-side bridge switch device later on. However, in the case of a split-capacitor design, the presence of clamping diodes in parallel with the series-connected split-capacitors causes unbalance in the split capacitor voltage. Particularly, the low-side capacitor gets fully discharged.

As a result of the unbalance in the resonant capacitor voltages, the resonant current does not change polarity before the PWM changes. Therefore, hard commutation occurs which can destroy the bridge switch devices on the primary side. Furthermore, there is an increased voltage stress in the secondary side SR switch devices which can damage the SR switch devices.

One conventional technique involves the use of asymmetrical PWM, with duty cycle different than 50%. In this case, the first PWM pulse presents a reduced duty cycle to ensure the resonant current polarity change. The same pattern can be applied in to resume operation during burst mode. If clamping diodes are present, the unbalance in the resonant capacitor voltages may require more than a single PWM pulse with duty cycle different than 50%, thus complicating the controller sequence.

A more complex conventional technique involves the use of the resonant current information to apply a time delay between the zero crossing of this current and the PWM change. This sequence completely avoids the hard commutation of the bridge switch devices on the primary side. However, resonant current sensing is needed for proper behavior. Furthermore, the timing is essential to avoid current stress in the circuit.

One disadvantage of the conventional techniques described above is that the SR switch devices on the secondary side of the LLC converter are turned off under certain load conditions. This leads to lower efficiency even in light-load operation, which can be further reduced depending on the switching frequency applied during burst mode operation. In burst mode, the LLC converter is turned off and then started again. The output voltage of the LLC converter increases in burst mode until the converter turns off again, at which point the output voltage begins to drop. Conventionally, all switch devices on the primary and secondary sides of the LLC converter are turned off (i.e. not switching) when the LLC converter is off. The secondary side switches are already off because of low current. When the output voltage increases to a certain level, the primary side switch devices are also turned off. When the output voltage drops to a certain level (under light-load conditions), the primary side switch devices are turned on again in burst mode while the secondary side switch devices remain off due to light-load conditions. Also problematic with the conventional techniques described above is that the use of the SR switch devices on the secondary side as diodes changes the gain behavior of the LLC converter. This gain change may lead to more burst mode operation, which increases the risk of hard commutation and additional stress in the switch devices.

SUMMARY

According to an embodiment of a method of operating an LLC converter having a primary side with power switch devices coupled to an LLC tank circuit at a common node, a secondary side with synchronous rectifier switch devices, and a transformer coupling the primary side to the secondary side, the method comprises: in a first mode of operation, switching the power switch devices and the synchronous rectifier switch devices at a frequency calculated to regulate an output voltage of the LLC converter, and in a second mode of operation during light-load conditions in which the output voltage is unregulated, switching the power switch devices until the output voltage rises to a first level and then turning off the power switch devices until the output voltage falls to a second level below the first level, and continuously switching the synchronous rectifier switch devices irrespective of the state of the output voltage.

According to an embodiment of an LLC converter, the LLC converter comprises a primary side with power switch devices coupled to an LLC tank circuit at a common node, a secondary side with synchronous rectifier switch devices, a transformer coupling the primary side to the secondary side and a controller. In a first mode of operation, the controller is operable to switch the power switch devices and the synchronous rectifier switch devices at a frequency calculated to regulate an output voltage of the LLC converter. In a second mode of operation during light-load conditions in which the output voltage is unregulated, the controller is operable to switch the power switch devices until the output voltage rises to a first level and then turn off the power switch devices until the output voltage falls to a second level below the first level, and continuously switch the synchronous rectifier switch devices irrespective of the state of the output voltage.

According to an embodiment of a controller for an LLC converter having a primary side with power switch devices coupled to an LLC tank circuit at a common node, a secondary side with synchronous rectifier switch devices, and a transformer coupling the primary side to the secondary side, the controller comprises digital circuitry operable to: in a first mode of operation, calculate a frequency for switching the power switch devices and the synchronous rectifier switch devices to regulate an output voltage of the LLC converter, and in a second mode of operation during light-load conditions in which the output voltage is unregulated, generate signals for switching the power switch devices until the output voltage rises to a first level and then turning off the power switch devices until the output voltage falls to a second level below the first level, and for continuously switching the synchronous rectifier switch devices irrespective of the state of the output voltage.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein keep the synchronous rectifier (SR) switch devices on the secondary side of an LLC converter on in burst mode operation during light-load conditions, while the (half or full) bridge switch devices on the primary side are off. In some embodiments, the maximum operating frequency is maintained for the SR switch devices during burst mode operation.

Figure 1:
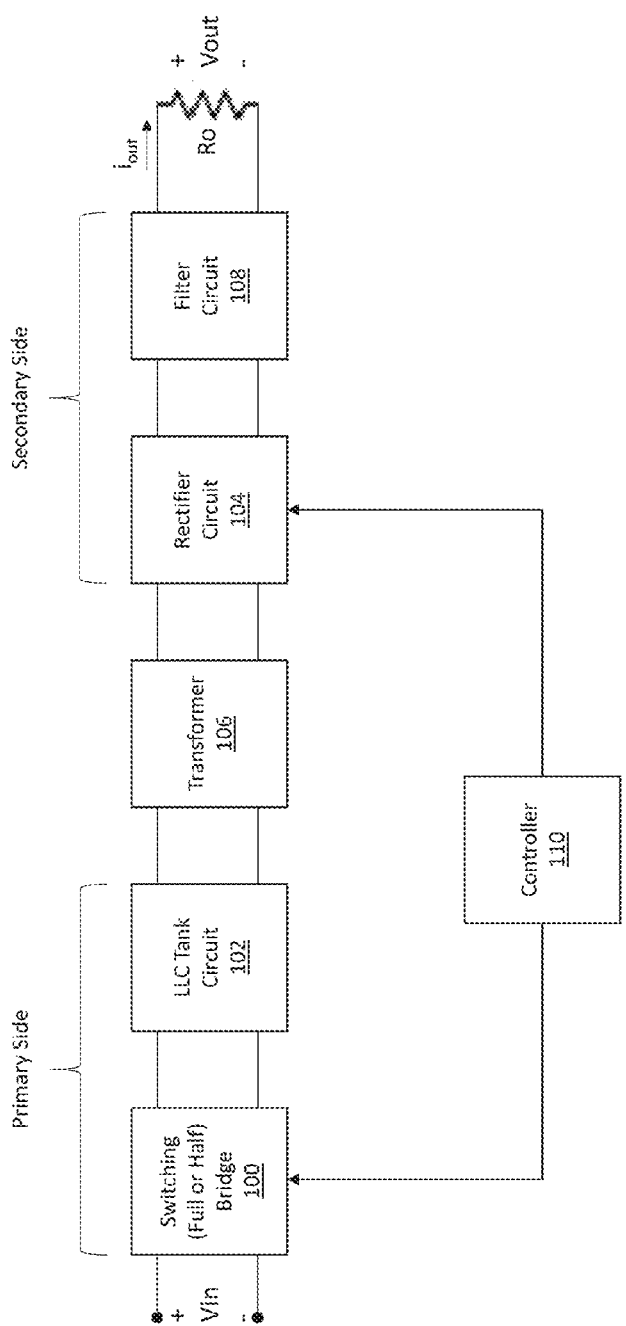
FIG. 1 illustrates a block diagram of an embodiment of an LLC converter that supports burst mode operation.

FIG. 1 illustrates an embodiment of an LLC converter. The LLC converter comprises a primary side with a switching (half or full) bridge 100 that includes power switch devices coupled to an LLC tank circuit 102 at a common node, and a secondary side with a rectifier circuit 104 that includes synchronous rectifier (SR) switch devices. A transformer 106 of the LLC converter couples the primary side to the secondary side.

The primary side converts a DC voltage (Vin) into a low harmonic content ac voltage. More particularly, the switching bridge 100 produces a square-wave voltage that is applied to the LLC tank circuit 102 which actively participates in determining the input-to-output power flow. Power flow can be controlled by the switching bridge 100, either by changing the frequency of the square wave voltage, its duty cycle, or both, or by special control schemes such as phase-shift control. The LLC tank circuit 102 is tuned to the fundamental component of the square wave, and responds negligibly to higher order harmonics so that its voltage and/or current are essentially sinusoidal or piecewise sinusoidal. Energy is transferred from the primary side to the secondary side via the transformer 106, by controlling the power switch devices of the switching bridge 100 accordingly. The rectifier circuit 104 on the secondary side is controlled to rectify the ac output from the primary side, which is then filtered by a filter circuit 108 to provide DC power (Vout/iout) to a load. The load is schematically represented by resistor Ro in FIG. 1.

The LLC converter also comprises a controller 110 for controlling the switching of the primary side and secondary side switch devices. The controller 110 can be a microcontroller, FPGA (field-programmable gate-array), system-on-chip device, or any other electronic device capable of implementing the control techniques described herein.

In a first mode of operation during normal load conditions, the controller 110 switches the power switch devices on the primary side and the SR switch devices on the secondary side at a frequency calculated to regulate the output voltage Vout of the LLC converter.

In a second mode of operation during light-load conditions in which load current demand is relatively low (compared to normal load conditions) and the output voltage Vout of the LLC converter is unregulated, the controller 110 switches the power switch devices on the primary side until the output voltage Vout rises to a first level and then turns off the power switch devices on the primary side until the output voltage Vout falls to a second level below the first level. The controller 110 continuously switches the SR switch devices on the secondary side irrespective of the state of the output voltage Vout in the second mode of operation.

The second mode of operation is commonly referred to as burst mode, and the maximum switching frequency of the SR switch devices is typically maintained during this mode of operation. However, for the proposed burst mode implementation described herein, the SR switch devices on the secondary side can be switched at any frequency. The switching frequency of the SR switch devices can be fixed or variable in burst mode. Preferably, the SR switch devices are switched at the maximum switching frequency (Fsw_max) in burst mode to ensure safe operation and easier control implementation. Switching the SR switch devices at the maximum switching frequency in burst mode also yields safe operation when starting the next burst cycle in normal operating mode, and is straightforward to implement by the controller 110.

However, as mentioned above, the SR switch devices on the secondary side can be switched at any suitable frequency during burst mode, and this frequency can be fixed or variable. The controller 110 ensures that the switching frequency of the SR switch devices does not drop below the resonant frequency of the LLC converter in burst mode. If the switching frequency of the SR switch devices is maintained above the resonant frequency of the LLC converter, capacitive mode and therefore commutation issues are avoided. In general, the controller 110 maintains the switching frequency of the SR switch devices above the LLC resonant frequency up to the maximum switching frequency in burst mode.

Figures 2A, 2B:
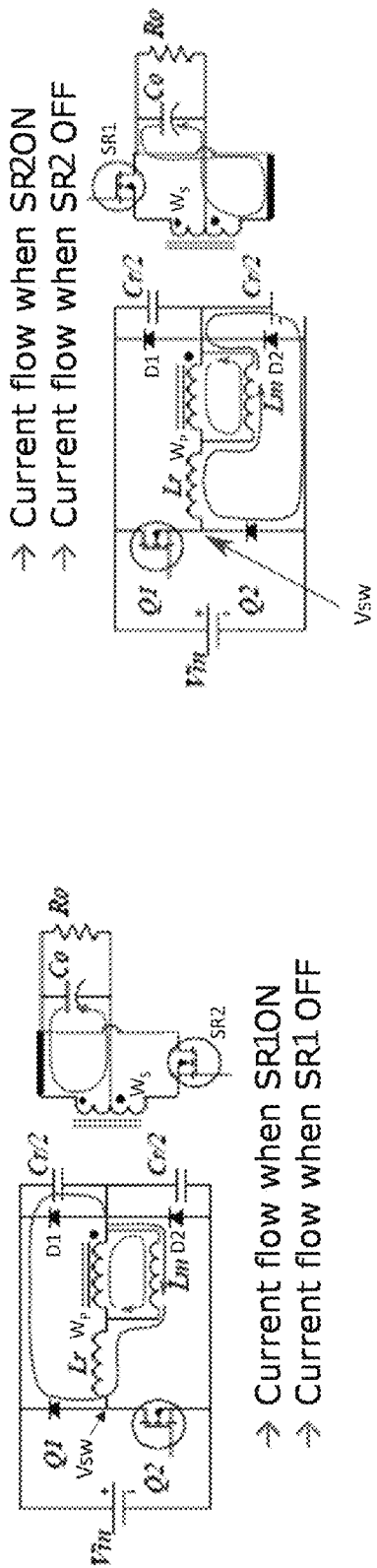
FIGS. 2A and 2B illustrates respective circuit diagrams of an LLC converter having a half bridge configuration, and the current flow paths in the LLC converter during different stages of burst mode operation.

FIGS. 2A and 2B illustrate the proposed burst mode implementation for the switching bridge 100 on the primary side having a half bridge configuration that includes high-side power switch Q1 coupled to low-side power switch Q2 at switching node Vsw. The SR switch devices SR1, SR2 on the secondary side can be connected to the secondary winding Ws transformer 106 in a full-wave rectifier configuration, a bridge rectifier configuration or a center-tapped configuration. Extension to the full bridge version of the switching bridge 100 is straightforward, and no further description is provided in this regard.

The LLC tank circuit 102 is formed by a resonant capacitor $C_r$ and two inductors Lr and Lm coupled between the switching bridge 100 and the primary winding $W_P$ of the transformer 106. Since the LLC tank circuit 102 includes three reactive elements ($C_r$, $L_r$ and $L_m$), there are two resonant frequencies associated with the LLC tank circuit 102. One resonant frequency is related to the condition of the transformer secondary winding Ws conducting. The other resonant frequency is related to the condition of the transformer secondary winding Ws being open. In one embodiment, the resonant capacitor $C_r$ is implemented as a pair of series-connected split capacitors $C_r/2$ connected in parallel with the power switch devices Q1 and Q2 of the switching bridge 100 as shown in FIGS. 2A and 2B. A pair of series-connected diodes D1, D2 can be coupled in parallel with the pair of series-connected split capacitors $C_r/2$, to limit the current.

FIG. 2A illustrates the part of burst mode in which SR switch device SR1 is on (conducting) and then turned off, while SR switch device SR2 is off (not conducting). The corresponding current flows in the primary and secondary sides of the LLC converter during both states of SR switch device SR1 is shown in FIG. 2A.

FIG. 2B illustrates the part of burst mode in which SR switch device SR2 is on (conducting) and then turned off, while SR switch device SR1 is off (not conducting). The corresponding current flows in the primary and secondary sides of the LLC converter during both states of SR switch device SR2 is shown in FIG. 2B.

As explained above, the controller 110 (not shown in FIGS. 2A and 2B for ease of illustration) continuously switches SR switch devices SR1 and SR2 on the secondary side irrespective of the state of the output voltage Vout in burst mode. The controller 110 switches power switch devices Q1 and Q2 on the primary side until the output voltage Vout rises to a first level and then turns off Q1 and Q2 until the output voltage Vout falls to a second level below the first level. Primary side power switch devices Q1 and Q2 are off in FIGS. 2A and 2B.

In FIG. 2A, energy stored in the output capacitor $C_O$ of the filter circuit 108 on the secondary side is used to magnetize the transformer 106 when SR switch device SR1 is on. When SR switch device SR1 turns off, the magnetizing current in the transformer 106 flows through a diode of power switch device Q1 on the primary side. The maximum switching frequency for SR switch device Q1 can be maintained during the burst mode. As a result, when the PWM signals are applied again to primary side power switch devices Q1 and Q2 when normal operation resumes, hard commutation of the power switch devices is avoided.

In FIG. 2B, energy stored in the output capacitor $C_O$ is used to magnetize the transformer 106 when SR switch device SR2 is on. When SR switch device SR2 turns off, the magnetizing current in the transformer 106 flows through a diode of power switch device Q2 on the primary side. As a result, the voltage at the switching node Vsw between power switch devices Q1 and Q2 on the primary side is clamped, ensuring that a bootstrap capacitor for the primary side driver of power switch device Q1 remains charged (the bootstrap capacitor and primary side driver circuitry are not shown in FIGS. 2A and 2B for ease of illustration). Furthermore, the split capacitors $C_r/2$ on the primary side remain balanced since no charging pulse is needed and the magnetizing current flows alternatively through both split capacitors $C_r/2$. The maximum switching frequency for SR switch device Q2 can be maintained during the burst mode to avoid hard commutation of the power switch devices on the primary side when normal operation resumes.

Figure 3:
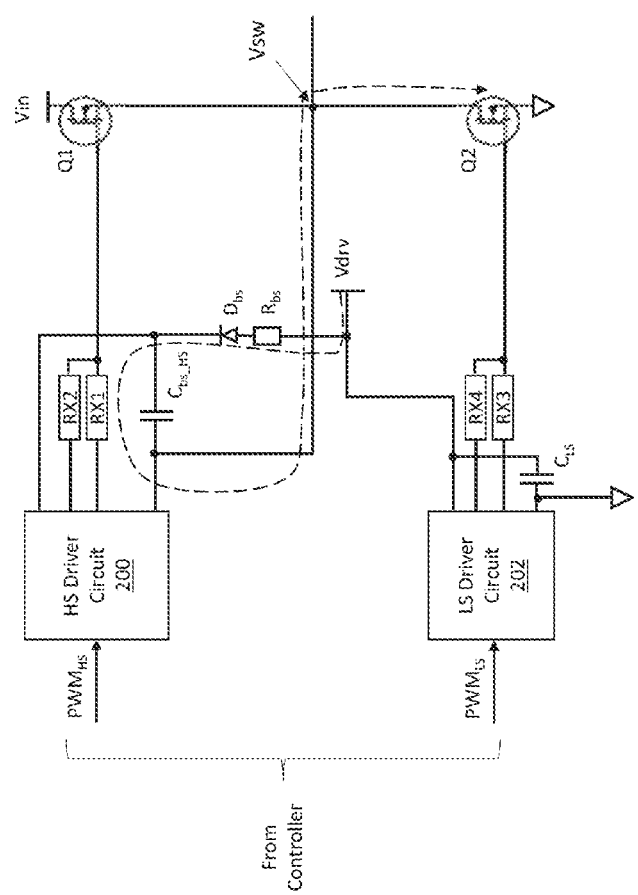
FIG. 3 illustrates a schematic diagram of primary side driver circuitry and a corresponding bootstrap capacitor for an LLC converter having a half bridge configuration and that supports burst mode operation.

FIG. 3 illustrates the primary side driver circuitry and corresponding bootstrap capacitor in more detail. The primary side driver circuitry includes high-side and low-side driver circuits 200, 202 for driving respective gates of power switch devices Q1 and Q2 of the switching bridge 100, in response to corresponding PWM signals ($PWM_{HS}$, $PWM_{LS}$) generated by the LLC controller 110. The primary side driver circuitry also includes biasing components RX1-RX4 for ensuring proper biasing of power switch devices Q1 and Q2, and a driver supply Vdrv for powering the driver circuits 200, 202. A bootstrap capacitor $C_{bs\_HS}$ connected to the high-side driver circuit 200 is charged by bootstrap diode $D_{bs}$ and resistor $R_{bs}$ from the driver supply Vdrv. A capacitor $C_{LS}$ connected to the low-side driver circuit 202 is directly connected to the driver supply Vdrv.

The high-side bootstrap capacitor $C_{bs\_HS}$ ideally should remain charged, otherwise high-side power switch device Q1 cannot turn on properly when returning to normal operation mode. The voltage at switching node Vsw is clamped in burst mode. The voltage at switching node Vsw is zero volts when low-side power switch device Q2 is conducting, and at Vin when high-side power switch device Q1 is conducting. The term "clamped" as used herein means that the voltage at switching node Vsw does not go above Vin or below zero volts. When the switching node Vsw node goes to zero volts, the high-side bootstrap capacitor $C_{bs\_HS}$ is charged through the diode of low-side power switch device Q2 to provide energy to turn on high-side power switch device Q1 during the next burst cycle in normal operation mode. When low-side switch device Q2 turns on again, the high-side bootstrap capacitor $C_{bs\_HS}$ is charged again. The dashed line in FIG. 3 represents charging of the high-side bootstrap capacitor $C_{bs\_HS}$ when the switching node Vsw between power switch devices Q1 and Q2 is connected to ground.

According to the burst mode embodiments described herein, no additional voltage stress is applied to the SR switch devices on the secondary side of the LLC converter since the voltage is limited by either the output voltage Vout or the reflected clamping voltage at the switching node Vsw on the primary side. The control techniques described herein limit the current during burst mode to the transformer magnetizing current. Furthermore, when normal operation is resumed, the balanced capacitors $C_r/2$ and charged driving scheme together with maximum frequency operation in burst mode ensures a transition with no increased current stress while transitioning back to normal operation.

The control techniques described herein can be implemented in a microcontroller. Any other digital control device with ADC (analog-to-digital conversion) and PWM modules, such as an FPGA or system-on-chip devices, can be used to implement the control techniques described herein.

Figure 4:
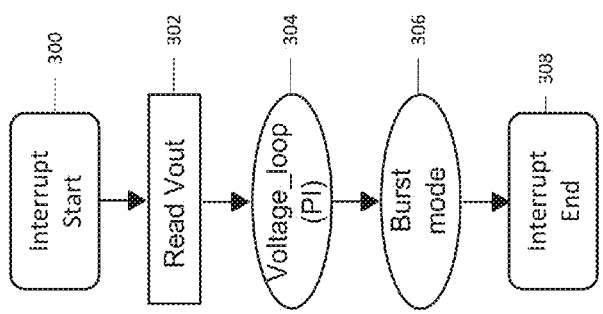
FIG. 4 illustrates a flow diagram of an embodiment of a normal control loop for an LLC converter that supports burst mode operation, with a fixed frequency interrupt.

FIG. 4 illustrates an embodiment of a flow diagram of an implementation with the normal control loop described herein with a fixed frequency interrupt. The flow diagram is simplified to emphasize the burst mode implementation. In FIG. 4, the control loop enters an interrupt routine (Block 300). In normal control mode, each switching cycle has a variable switching frequency (Fsw) determined by the controller 110 based on the measured output voltage Vout (Block 302). Output voltage (Vout) information is used in a voltage loop of the controller 110, which in one embodiment is a PI (proportional-integral) control loop that calculates the frequency needed to regulate the output voltage Vout (Block 304). This information together with the output voltage information is used by the controller 110 to decide whether to enter burst mode (Block 306). That is, the controller 110 uses a combination of operating frequency and output voltage to determine when to enter burst mode and return to normal control mode (Block 306). The control loop returns from the interrupt routine after the burst mode completes (Block 308). The sequence (Blocks 302 through 306) between the interrupt start (Block 300) and interrupt end (Block 308) is repeated at fixed frequency during the interrupt.

Figure 5:
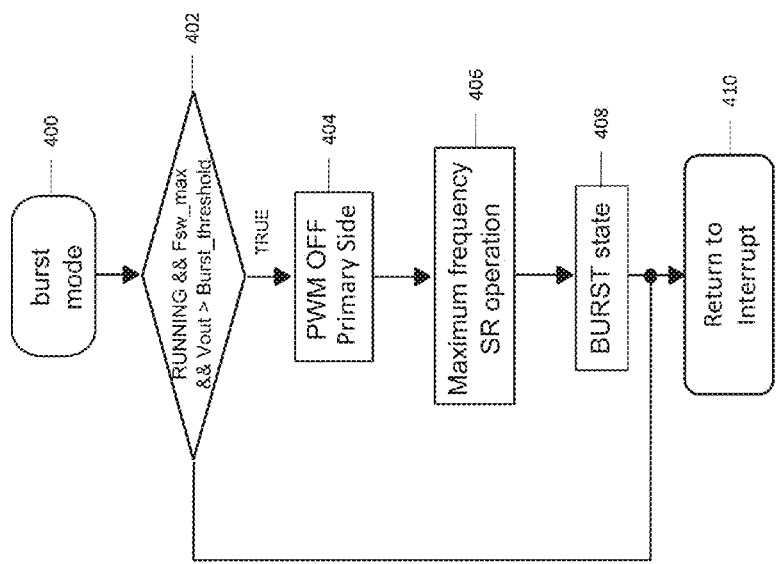
FIG. 5 illustrates a flow diagram of an embodiment of a burst mode control loop for an LLC converter.

FIG. 5 illustrates an embodiment of a flow diagram of an implementation of the burst mode control algorithm implemented by the controller 110. Upon entering burst mode (Block 400), if the controller 110 requires the maximum switching frequency (Fsw_max) and the output voltage Vout is over a defined value (Burst_threshold), the controller 110 implements the proposed burst mode described herein (Block 402). At the beginning of the burst mode, the PWM signals applied to the switching (half or full) bridge on the primary side of the LLC converter are set to zero, turning off the power switch devices on the primary side (Block 404). The controller 110 also fixes the switching frequency of the SR switch devices on the secondary side to the maximum frequency Fsw_max as explained previously herein (Block 406) to place the secondary side SR switch devices in a burst state (Block 408). At the end of the burst mode, the controller 110 returns to the interrupt routine (Block 410).

When burst mode operation is triggered in general, the state of the LLC converter is changed to burst mode. In this state, the primary side PWM control remains off with maximum (or other) switching frequency applied to the SR switch devices on the secondary side until the output voltage Vout decreases to the target voltage of the application. At that moment, the maximum (or other) switching frequency is applied to both the primary side power (half or full bridge) switch devices and the secondary side SR switch devices. The state of the LLC converter changes back to running in the normal mode, and the control algorithm waits for a possible new burst mode trigger.

Figure 6:
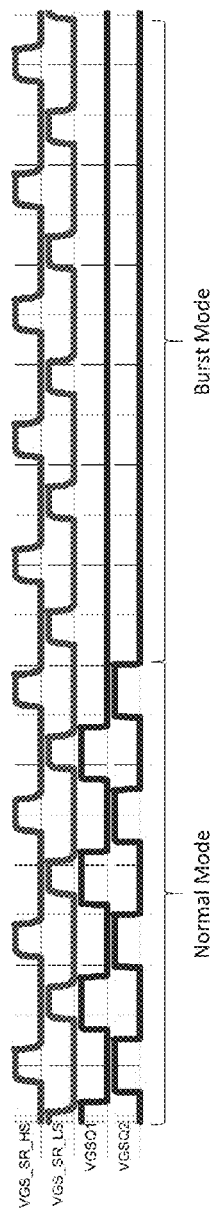
FIG. 6 illustrates PWM signals for controlling primary side half bridge switch devices and secondary side synchronous rectifier switch devices of an LLC converter as the LLC converter exits normal operating mode and enters burst mode.

FIG. 6 illustrates the PWM signals applied to the gates of primary side half bridge switch devices Q1 and Q2 and secondary side SR switch devices SR1 and SR2 illustrated in FIGS. 2A and 2B, as the LLC converter exits normal operating mode and enters burst mode.

Figure 7:
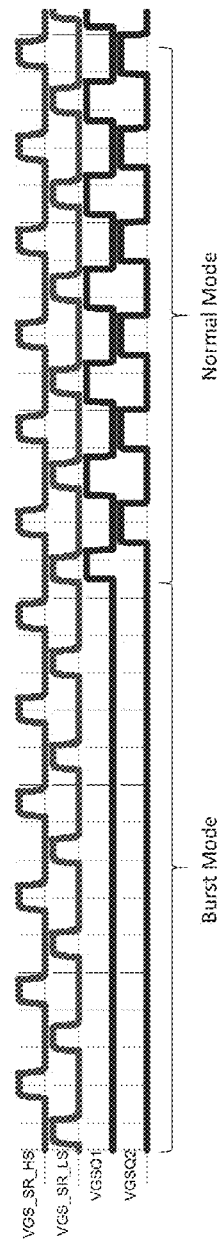
FIG. 7 illustrates PWM signals for controlling primary side half bridge switch devices and secondary side synchronous rectifier switch devices of an LLC converter as the LLC converter exits burst mode and enters to normal operating mode.

FIG. 7 illustrates the PWM signals applied to the gates of primary side half bridge switch devices Q1 and Q2 and secondary side SR switch devices SR1 and SR2 illustrated in FIGS. 2A and 2B, as the LLC converter exits burst mode and returns to normal operating mode.

In FIGS. 6 and 7, the signal labeled 'VGS_SR_HS' represents the PWM signal applied to the gate of SR switch device SR1 in FIGS. 2A and 2B. The signal labeled 'VGS_SR_LS' represents the PWM signal applied to the gate of SR switch device SR2 in FIGS. 2A and 2B. The signal labeled 'VGSQ1' represents the PWM signal applied to the gate of primary side half bridge switch device Q1 in FIGS. 2A and 2B. The signal labeled 'VGSQ2' represents the PWM signal applied to the gate of primary side half bridge switch device Q2 in FIGS. 2A and 2B. When the LLC controller 110 enters burst mode, the primary side PWM signals VGSQ1 and VGSQ2 remain off with maximum (or other) switching frequency applied to the secondary side PWM signals VGS_SR_HS and VGS_SR_LS until the output voltage Vout decreases to the target voltage of the application.

Figure 8:
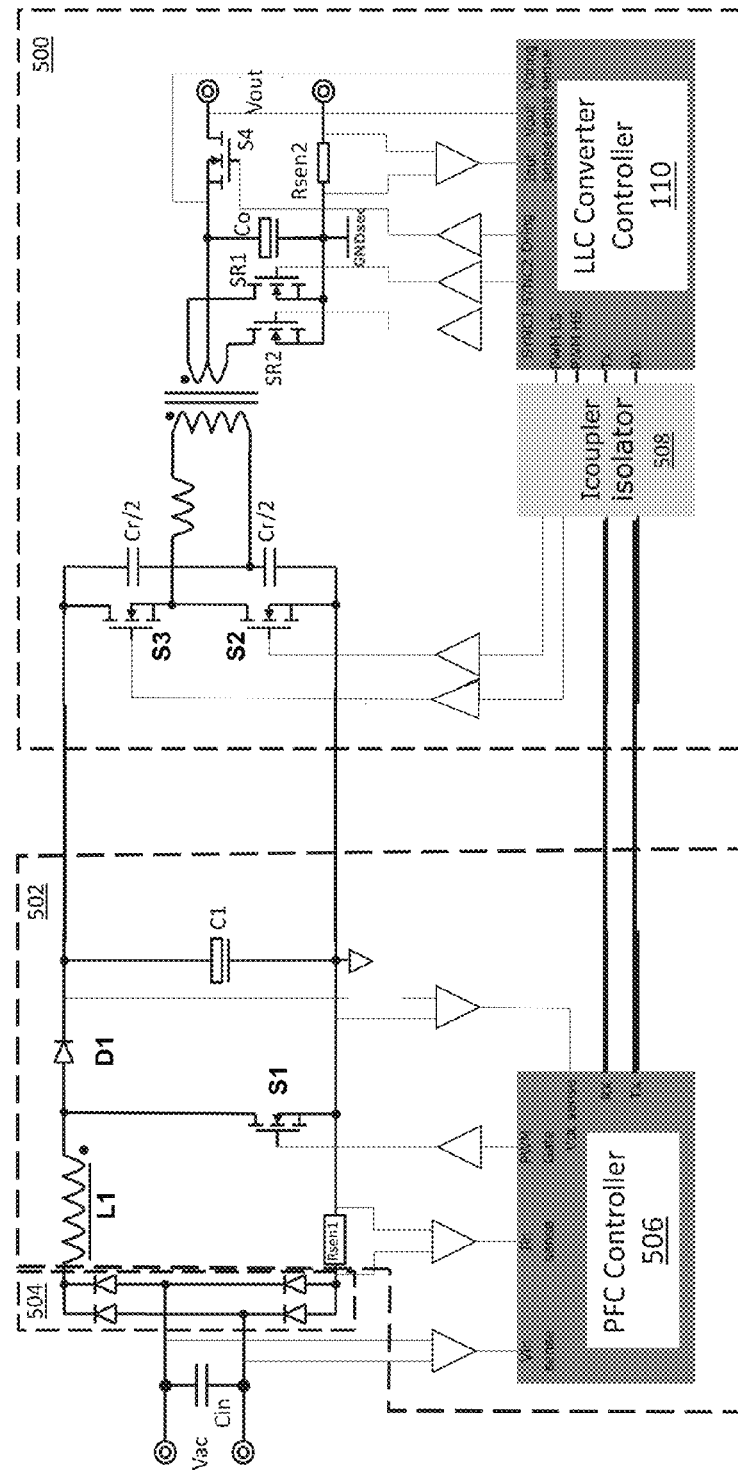
FIG. 8 illustrates a block diagram of an embodiment of a power supply that includes a PFC circuit and an LLC converter that supports burst mode operation.

FIG. 8 illustrates an embodiment of a power supply that comprises an LLC converter 500 e.g. of the kind previously described herein, a PFC (power factor correction) circuit 502 coupled to a bulk capacitor C1 and a diode bridge rectifier 504 coupled between the PFC circuit 502 and an input capacitor Cin in parallel with the AC input source Vac. The bulk capacitor C1 couples the PFC circuit 502 and the LLC converter 500. The PFC circuit 502 comprises an inductor L1, diode D1, capacitor C1 and switch device S1. Operation of the PFC circuit 502 is controlled by a PFC controller 506, which is in communication with the LLC controller 110 over an optocoupler 508. The PFC controller 506 can sense the AC (input) voltage across the input capacitor Cin ('Vin sense'), the rectified input current ('Iin sense') flowing in sense resistor Rsen1 and the DC voltage across the bulk capacitor C1 ('Vdc sense'). The PFC controller 506 also generates a PWM signal ('PWM Gate') for controlling switch device S1 of the PFC circuit 502.

The primary side of the LLC converter is configured in a half bridge configuration, e.g., as described previously herein in connection with FIGS. 2A and 2B, where power switch device S2 is the low-side switch of the switching half bridge and power switch device S3 is the high-side switch. The LLC controller 110 generates respective PWM signals ('PWM LS' and 'PWM HS') for controlling the primary side power switch devices S1 and S2. These PWM signals are communicated to the primary side of the LLC converter via the optocoupler or similar circuit 508. The LLC controller 110 also generates respective PWM signals ('SYNC1' and 'SYNC2') for controlling the secondary side SR switch devices SR1 and SR2, and generates another PWM signal ('Oring') for controlling switch device S4 connected between output capacitor Co and the output of the LLC converter. The LLC controller 110 implements the burst mode features described herein. The LLC controller 110 can sense the voltage at the output of the LLC converter ('Vout sense'), the voltage across the output capacitor Co ('Voring sense') and the output current flowing in sense resistor Rsen2 ('Iout sense'), to aid in overall control of the LLC converter, including in deciding when to enter and exit burst mode.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating an LLC converter having a primary side with power switch devices coupled to an LLC tank circuit at a common node, a secondary side with synchronous rectifier switch devices, and a transformer coupling the primary side to the secondary side, the method comprising:
   in a first mode of operation, switching the power switch devices and the synchronous rectifier switch devices at a frequency calculated to regulate an output voltage of the LLC converter; and
   in a second mode of operation during light-load conditions in which the output voltage is unregulated, switching the power switch devices until the output voltage rises to a first level and then turning off the power switch devices until the output voltage falls to a second level below the first level, and continuously switching the synchronous rectifier switch devices irrespective of the state of the output voltage.

2. The method of claim 1, wherein in the second mode of operation the synchronous rectifier switch devices are continuously switched at a fixed frequency irrespective of the state of the output voltage.

3. The method of claim 1, wherein in the second mode of operation:
   the power switch devices are switched at a maximum switching frequency until the output voltage rises to the first level and then turned off until the output voltage falls to the second level; and
   the synchronous rectifier switch devices are continuously switched at the maximum switching frequency irrespective of the state of the output voltage.

4. The method of claim 1, wherein in the second mode of operation:
   the power switch devices are switched at a maximum switching frequency until the output voltage rises to the first level and then turned off until the output voltage falls to the second level; and
   the synchronous rectifier switch devices are continuously switched at a frequency above a resonance frequency of the LLC converter up to the maximum switching frequency irrespective of the state of the output voltage.

5. The method of claim 1, wherein the power switch devices on the primary side are connected to the LLC tank circuit in a half-bridge or full-bridge configuration, and wherein the synchronous rectifier switch devices on the secondary side are connected to the transformer in a full-wave rectifier configuration, a bridge rectifier configuration or a center-tapped configuration.

6. An LLC converter, comprising:
   a primary side with power switch devices coupled to an LLC tank circuit at a common node;
   a secondary side with synchronous rectifier switch devices;
   a transformer coupling the primary side to the secondary side; and
   a controller operable to:
      in a first mode of operation, switch the power switch devices and the synchronous rectifier switch devices at a frequency calculated to regulate an output voltage of the LLC converter; and
      in a second mode of operation during light-load conditions in which the output voltage is unregulated, switch the power switch devices until the output voltage rises to a first level and then turn off the power switch devices until the output voltage falls to a second level below the first level, and continuously switch the synchronous rectifier switch devices irrespective of the state of the output voltage.

7. The LLC converter of claim 6, wherein in the second mode of operation the controller is operable to continuously switch the synchronous rectifier switch devices at a fixed frequency irrespective of the state of the output voltage.

8. The LLC converter of claim 6, wherein in the second mode of operation the controller is operable to switch the power switch devices at a maximum switching frequency until the output voltage rises to the first level and then turn off the power switch devices until the output voltage falls to the second level, and wherein in the second mode of operation the controller is operable to continuously switch the synchronous rectifier switch devices at the maximum switching frequency irrespective of the state of the output voltage.

9. The LLC converter of claim 6, wherein in the second mode of operation the controller is operable to switch the power switch devices at a maximum switching frequency until the output voltage rises to the first level and then turn off the power switch devices until the output voltage falls to the second level, and wherein in the second mode of operation the controller is operable to continuously switch the synchronous rectifier switch devices at a frequency above a resonance frequency of the LLC converter up to the maximum switching frequency irrespective of the state of the output voltage.

10. The LLC converter of claim 6, wherein the power switch devices on the primary side are connected to the LLC tank circuit in a half-bridge or full-bridge configuration, and wherein the synchronous rectifier switch devices on the secondary side are connected to the transformer in a full-wave rectifier configuration, a bridge rectifier configuration or a center-tapped configuration.

11. The LLC converter of claim 10, wherein the power switch devices comprise a high-side switch device coupled between an input voltage terminal and the common node and a low-side switch device coupled between the common node and ground.

12. The LLC converter of claim 11, wherein the high-side switch device is configured to clamp the common node at a potential of the input voltage terminal when the high-side switch device is off in the second mode of operation, and wherein the low-side switch device is configured to clamp the common node at ground when the low-side switch device is off in the second mode of operation.

13. The LLC converter of claim 11, further comprising a first driver circuit configured to drive a gate of the high-side switch device and a second driver circuit configured to drive a gate of the low-side switch device, wherein the first driver circuit comprises a boot strap capacitor coupled to the common node and configured to provide energy to the high-side switch device at the beginning of a new switching cycle in the first mode of operation, and wherein the low-side switch device includes a diode configured to couple the boot strap capacitor to a driver supply terminal for charging the boot strap capacitor when the common node is clamped to ground in the second mode of operation.

14. The LLC converter of claim 10, wherein the primary side comprises a pair of series-connected split capacitors connected in parallel with the power switch devices in the half-bridge configuration and a pair of series-connected clamping diodes in parallel with the pair of series-connected split capacitors.

15. A power supply comprising the LLC converter of claim 6, a PFC (power factor correction) circuit, a diode bridge rectifier coupled between the PFC circuit and an AC input source, and a bulk capacitor coupling the PFC circuit to the LLC converter.

16. A controller for an LLC converter having a primary side with power switch devices coupled to an LLC tank circuit at a common node, a secondary side with synchronous rectifier switch devices, and a transformer coupling the primary side to the secondary side, the controller comprising digital circuitry operable to:
  in a first mode of operation, calculate a frequency for switching the power switch devices and the synchronous rectifier switch devices to regulate an output voltage of the LLC converter; and
  in a second mode of operation during light-load conditions in which the output voltage is unregulated, generate signals for switching the power switch devices until the output voltage rises to a first level and then turning off the power switch devices until the output voltage falls to a second level below the first level, and for continuously switching the synchronous rectifier switch devices irrespective of the state of the output voltage.

17. The controller of claim 16, wherein in the second mode of operation the digital circuitry is operable to generate signals for continuously switching the synchronous rectifier switch devices at a fixed frequency irrespective of the state of the output voltage.

18. The controller of claim 16, wherein in the second mode of operation the digital circuitry is operable to generate signals for switching the power switch devices at a maximum switching frequency until the output voltage rises to the first level and then turning off the power switch devices until the output voltage falls to the second level, and for continuously switching the synchronous rectifier switch devices at the maximum switching frequency irrespective of the state of the output voltage.

19. The controller of claim 16, wherein in the second mode of operation the digital circuitry is operable to generate signals for switching the power switch devices at a maximum switching frequency until the output voltage rises to the first level and then turning off the power switch devices until the output voltage falls to the second level, and for continuously switching the synchronous rectifier switch devices at a frequency above a resonance frequency of the LLC converter up to the maximum switching frequency irrespective of the state of the output voltage.

20. The controller of claim 16, wherein the digital circuitry comprises a PI controller.

* * * * *